United States Patent Office 2,805,931
Patented Sept. 10, 1957

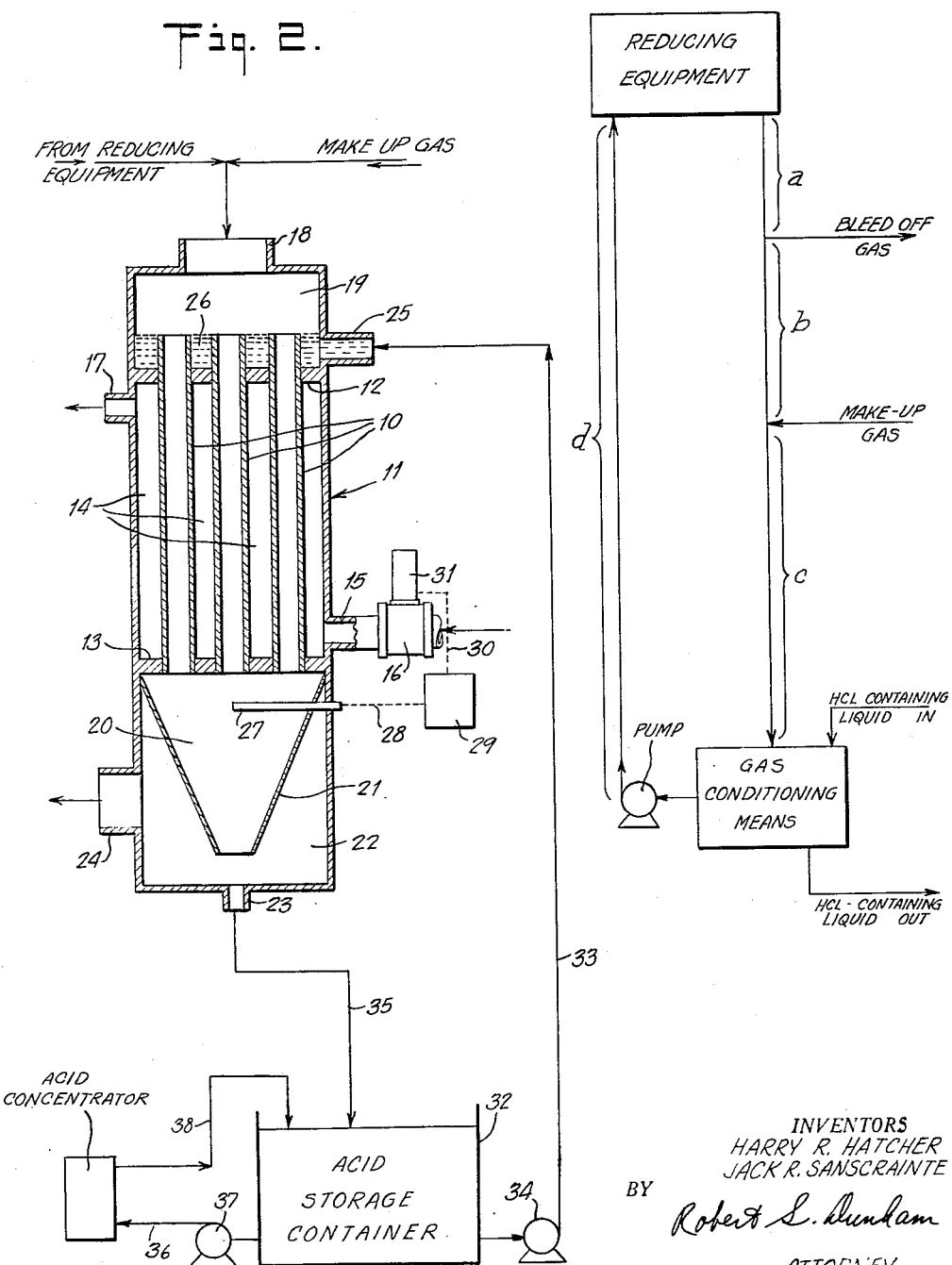

2,805,931

PROCESS OF TREATING GASES CONTAINING HCl TO REDUCE THE WATER CONTENT THEREOF

Harry R. Hatcher, Maumee, and Jack R. Sanscrainte, Cleveland, Ohio, assignors to Republic Steel Corporation, Cleveland, Ohio, a corporation of New Jersey Application September 23, 1954, Serial No. 457,963

14 Claims. (Cl. 75—37)

The present invention relates to a process of treating gases containing HCl to reduce the water content thereof and more particularly to such a process for treating hot gases, so as simultaneously to cool these gases and to reduce the water content or concentration thereof to some predetermined and adjustably variable concentration, and also to adjust the HCl concentration thereof so that it may be established at a variable and predetermined point in the gases leaving the treating or conditioning zone.

It has been found in the reduction of certain oxide type ores, for example iron ore, that advantageous results are obtained if the ore is reduced by a gaseous reducing agent, for instance hydrogen, while there is present during the reduction and in the reducing zone a more or less predetermined concentration of gaseous hydrogen chloride (HCl). The concentration of the reducing gas, such as hydrogen, is, of course, important in such a process. It has also been found that the concentration of the hydrogen chloride, either as an absolute concentration in the gas, for instance, volume percent, or as a ratio by volume of HCl to the reducing gas such as hydrogen, is important in connection with reduction reactions, as aforesaid. This type of reduction reaction, per se, is not a part of the present invention, but is more particularly described and claimed in the patent to Crowley, No. 2,744,002, issued May 1, 1956.

In order to conduct such a process on a practical commercial scale, some economical method must be employed for providing a gas of the desired concentration, particularly with respect to HCl concentration and also, in order that the process may be operated economically, this gas must be recycled through the reducing zone. Any other method would necessarily involve the loss (or utilization in some other manner) of a large quantity of gaseous HCl and probably, also, the loss (or separate utilization) of a substantial quantity of reducing gases, which were not used up during a single pass of the treating gas through the reducing zone. A practical embodiment of the process, therefore, employs recycling of the reducing gas, with an appropriate gas-conditioning during the recycling so as to reinstate, in effect, the original gas composition. Thus several things have to be done including: (a) the water formed during a single pass of the reducing gas through the reducing zone must be extracted to bring the water content down to that value which the gas had when entering the reducing zone; (b) the hydrogen which was used in forming water must be replaced; and (c) the hydrogen chloride content of the recycled gas must be maintained substantially constant. It is noted that in this reducing reaction HCl is not used up, but acts in effect, as a catalyst. The concentration thereof is quite critical, however, so that it should be maintained at some predetermined value, considered either on the basis of absolute percentage concentration by volume based upon the entire gas present or considered on the basis of the volume ratio of gaseous HCl to hydrogen or some other gaseous reducing agent present.

The ordinary way in which water is extracted from hot gases is by cooling these gases sufficiently to condense the amount of water to be extracted. If this method were resorted to, a large proportion of the gaseous hydrogen chloride present in the gases would dissolve in the water so condensed and would pass out in solution in this water. Under such circumstances, the recapture of the gaseous HCl as such and the feeding of sufficient anhydrous HCl into the gases being recycled would be very costly and complicated. The present invention provides a method of avoiding this.

The present invention also provides a method by which the water content of the gas is controlled by using equipment requiring much less capacity and space than would the equipment for practicing other known methods for accomplishing this same end.

Other processes than that of reducing a metal oxide may also call for the operation of the method or process of the present invention, that is, where water is to be extracted from a circulating body of hot gases containing HCl and wherein the HCl concentration is to be in effect, maintained constant, or at least the amount of HCl being circulated in any time period is to be maintained substantially constant. One such other process could, for example, be the chloridization of an oxide-type ore in which HCl would be used up in the process and would have to be replenished by the addition of make-up gases, containing HCl, but in which water would be produced in the process which would have to be eliminated from the recycled gases, while preventing the elimination of any HCl remaining in these gases.

Summarizing the present invention, therefore, it comprises, from a broad point of view, the passing of a stream of hot gases, containing hydrogen chloride and water vapor, substantially continuously through a gas-conditioning zone. The invention further comprises passing through this gas-conditioning zone and in intimate contact with the gases passing therethrough, a current of an aqueous solution of HCl. Suitable temperature controlling means may be applied for cooling the materials entering or within the gas-conditioning zone, so as to reduce the temperature of the gases to a desired value by the time the gases leave this zone, which is important, as hereinafter set forth. The invention is based upon the principle that by the time the gases are in readiness to be discharged from the gas-conditioning zone, they will be in substantial equilibrium with the aqueous HCl solution then and there in contact with such gases at the then temperature of the gases and of the aqueous solution, which temperatures will be substantially the same. The vapor pressure of water vapor and of HCl above a known concentration of an aqueous HCl solution being known at different predetermined temperatures, the concentration of both water vapor and HCl gas in the gases at the equilibrium conditions may, therefore, be predetermined by controlling the temperature at this point, by the use of conventional temperature controlling means applied at some suitable point or points in the process and, further, by controlling the concentration of the aqueous HCl solution in contact with the gases at the equilibrium point or zone, which is immediately prior to the gases leaving the gas-conditioning zone.

While the temperature control for cooling could be applied in various ways, as hereinafter noted, the gas-conditioning zone, in accordance with the present invention, is preferably constituted by a condenser of the falling film type, i. e. where a liquid is supplied to the upper end portion of the condenser and runs down over a heat transfer surface, so that a film of the liquid is disposed between the gas stream passing through the condenser and the heat transfer surface and so that a cooling fluid may be caused to flow on the other side of the heat transfer surface. In practice, the heat transfer surface is provided by a plurality of condenser tubes through which the gases pass.

Means are preferably provided for controlling the concentration of the aqueous solution of HCl supplied to the gas-conditioning zone as aforesaid. Other and independently controllable means are also preferably provided for controlling the temperature of the gases upon leaving the gas-conditioning zone. In a preferred embodiment these means comprise a thermocouple responsive to the gas temperature, a conventional temperature control apparatus and a means responsive to this apparatus to control the rate of flow of the cooling fluid in heat transferring relation with the heat transfer surface aforesaid. Flow of the gases through the gas-conditioning zone may be effected by the use of a circulating pump.

The invention will be better understood by reference to the accompanying drawings in which:

Figure 1 is an illustration, on a flow-sheet basis, of a recirculation cycle for a reducing process embodying the present invention; and Fig. 2 is a diagrammatic illustration of a falling film type condenser apparatus which is usable in a preferred embodiment of the present invention.

Referring now to Figure 1 of the accompanying drawing, there is illustrated on a flow-sheet basis a gas recycle path, including a block designated "Reducing equipment." This figure also illustrates, diagrammatically, a pump by which the gas may be circulated through the system. This figure shows the application of the present invention to a process such as is disclosed in detail in the Crowley application hereinabove referred to, wherein iron oxide is being reduced by a gaseous reducing agent, the gaseous reducing constituent of which is usually hydrogen or includes hydrogen and in which there is also maintained a substantial, predetermined concentration of gaseous hydrogen chloride, this concentration preferably being predetermined as a ratio of HCl to hydrogen and/or as a ratio of HCl to water vapor in the gases entering the reducing equipment. In most embodiments of this invention, there is always present, at least one inert gas in addition to the water vapor, hydrogen chloride and the one or more gaseous reducing agents. In view of the presence of some inert gas and the requirement that make-up gas must be supplied to the gases being recycled, it is obvious that the inert gas would build up in concentration if provisions were not made for bleeding out some of the gas being recycled and for adding a sufficient amount of make-up gas to compensate for that which is lost by the bleeding out or bleeding off operation or otherwise. These two method steps are illustrated diagrammatically in Figure 1.

The present invention is particularly embodied in the "Gas conditioning means" so designated in Fig. 1 and illustrated in greater detail in Fig. 2, which has a fourfold function as hereinafter set forth:

(1) It must reduce the temperature of the gas sufficiently so that the water content thereof may be reduced to a necessary extent, i. e. to eliminate from the gas the amount of water which was taken up in passing through the reducing equipment;

(2) It must bring the gas into contact with the aqueous HCl solution under such conditions and for such a period of time (which must not exceed a practically expedient limit) in order for an equilibrium to be essentially established between the gas and the solution;

(3) The water content of the gases must be reduced to a desired point. This, of course, can be done conventionally by any condensing equipment. The problem in the present instance is to do it without at the same time removing from the gas stream a substantial amount of its hydrogen chloride content which it is desired to maintain substantially at a given value as aforesaid; and (4) To establish, within the desired limits, the concentration of hydrogen chloride in the gas stream leaving the gas-conditioning means. In this way the concentration of HCl in the gases may be adjusted to any predetermined value, whether that value be an absolute concentration or a desired ratio in respect to some other gas such as hydrogen, as aforesaid.

The apparatus required for carrying on the process of the present invention may take several forms. As such, it may be considered broadly as a means providing a gas-conditioning zone. Such a means may be, as shown in Fig. 2 and as presently preferred, a condenser of the falling film type. What is required broadly is that there be a means by which a gas to be conditioned is passed substantially continuously through the gas-conditioning zone and brought into intimate contact with an aqueous solution of HCl under such conditions that the gas and the liquid will come into substantial equilibrium with each other. The equilibrium region or portion of the gas-conditioning zone is that adjacent to the exit point of the gas from this zone or from contact with the liquid in the zone. In all instances in accordance with this invention the liquid is an aqueous solution of HCl.

From a broad point of view the gas-conditioning zone could be embodied in a so-called scrubbing tower, the construction and use of which is now well known. The gas and the liquid in question may be passed through the gas-conditioning zone either in a concurrent or countercurrent manner, the important part being only that they shall come substantially to equilibrium adjacent to the place where the gas leaves the zone and leaves contact with the liquid. The necessary controls are preferably effected by controlling the temperatures of some one or more of the constituents and of the environments, such that the gas at the critical point of its path, i. e. immediately prior to leaving the gas-conditioning zone, will be at some predetermined temperature. The liquid at this same point in its path through the gas-conditioning zone should be at the same temperature. As will now be understood, the temperature is so selected that the vapor pressure of water will give the desired concentration of water vapor in the gas leaving the gas-conditioning zone. The temperature and the HCl concentration in the liquid are further chosen so that the vapor pressure of gaseous HCl above the liquid at the temperature in question will give a desired gaseous HCl concentration in the gas leaving the gas-conditioning zone. The vapor pressures of water and of HCl in equilibrium with particular concentrations of aqueous solutions of HCl at various temperatures are known. The several variables which can thus be controlled in the present instance are the concentration of the aqueous solution of HCl entering the gas-conditioning zone and the final temperature of the gases at their critical point aforesaid. The temperature may be controlled either by controlling the temperature of the gases entering the gas-conditioning zone, the temperature of the liquid entering the gas-conditioning zone or the temperatures within the zone affecting both gas and liquid. The last of these three courses is employed in accordance with the preferred embodiment of the invention. Obviously, some combination of two or more of these methods of temperature control could be used if desired.

From the point of view of temperature control, and as the gases to be treated are relatively hot as compared with their desired temperature on leaving the gas-conditioning zone, positive cooling must be effected at some stage of the process. This is preferably effected by providing a path for a cooling fluid in heat transferring relation to the gases passing through the gas-conditioning zone.

In the preferred embodiment of the invention shown in Fig. 2, wherein a condenser means of the falling film type is employed, there is provided a heat transfer surface or wall constituted by the inside surface or the walls of several tubes 10 forming parts of a condenser structure generally indicated at 11. As shown, the condenser is made similar to a fire tube boiler and includes a pair of tube sheets 12 and 13 in which the several tubes 10 are mounted. Surrounding the tubes 10 and within the condenser 11 is a space 14, constituting a path for a cooling fluid which is admitted through a passage 15 under control of a valve generally indicated at 16, and passes out through a passage 17. Gas to be treated is adapted to enter the top of the condenser 11 through a passage 18 and pass to a header portion 19, from which it divides to pass through the several tubes 10 and thence passes to a lower header space 20, which is preferably provided as diagrammatically illustrated in Fig. 2 with a means for separating liquid from the gas. As shown, this means may comprise a substantially conical wall member 21, so arranged that the liquid will settle in the bottom of a chamber 22 and may pass out through a pipe 23. Gases pass from the chamber 22 through a pipe or duct 24. It will be understood that any other suitable means, equivalent in its general capabilities to the requirements hereinabove set out, may be employed in lieu of the device particularly shown in Fig. 2.

In addition to the structure previously described, and in order that the condenser be of the falling film type, an aqueous solution of HCl is supplied to the lower portion of the header 19 through a pipe 25, this solution forming a pool at 26 and thence flowing down through each of the tubes 10, forming a liquid film on the insides of these tubes. The liquid film serves to increase the efficiency of the condenser and to bring the liquid and the gases, which thus pass in intimate contact with each other through the tubes 10, substantially to an equilibrium condition adjacent to the lower ends of these tubes. In practice, it also increases the heat transfer efficiency of the device. The only other feature of the device of Fig. 2 remaining to be discussed is temperature control. As hereinabove stated, it is important that the gases be brought to some predetermined temperature at the critical point in their travel through the gas-conditioning zone. This point is just prior to the passage of the gases out of contact with the liquid in the zone and, in practice, referring to the device of Fig. 2, may be said to be at the bottom portions of the tubes 10 and in the header space 20 within the conical member 21. As this critical point is the place where accurate temperature control is desired, this place is used as the temperature index for control purposes. Any suitable temperature responsive means, such as a thermocouple 27, may be disposed at this critical point and have the electrical leads thereto carried outside in a suitable manner, as indicated by a broken line 28, to a control equipment 29 of some desired or conventional type, which in turn is connected through a conventional means indicated by a broken line 30 to a valve operating means 31, which is in turn mechanically connected to the valve 16. In this way the rate of flow of cooling medium through the space 14 in heat transferring relation with the liquid flowing through the apparatus and with the gas flowing therethrough may be controlled, so as to control the amount of cooling of the gases effected during the passage thereof through the gas-conditioning zone, which in turn controls the temperature of the several fluids at the critical point at which the thermocouple is located.

While any suitable means may be used for supplying an aqueous solution of HCl through the passage 25 to the falling film condenser, there is illustrated a means embodying an acid storage container 32 from which acid may be supplied through a passage 33 under control of a suitable pump 34 to the pipe 25. The pipe 23 is connected through a duct 35 to the container 32. Any suitable means may be employed for preventing the undue and continued dilution of the acid being recirculated through the passages hereinabove described. As a practical matter, it is preferred that the body of acid being recirculated shall be so large as compared with the amount of water being added thereto in the course of any single recirculation that the concentration of the acid changes little between its entrance to and its exit from the condenser apparatus 11. For example, one set of concentrations contemplated for use is 26% entrance acid and 25.6% exit acid, the concentrations in each instance being expressed as weight percent HCl to total aqueous HCl solution. One method which has been contemplated for use for eliminating continuous dilution and for maintaining the desired acid strength in the circulatory path aforesaid is to withdraw acid substantially continuously from the container 32 through a line 36 under control of a pump 37; to concentrate this acid in any suitable way known to the art and which per se forms no part of the present invention in a means diagrammatically shown on the accompanying drawing; and then to return a more concentrated acid through a line 38 to the container 32 from the concentrating equipment. The more concentrated acid being returned may, for example be 32%, calculated on the same basis given above.

The invention which has been described hereinabove from a general point of view, and from the point of view of apparatus in which it may be carried out, is further illustrated by several examples which follow.

EXAMPLE I

As stated above, various predetermined conditions may be established in the gaseous mixture, or exit gas, leaving the gas-conditioning zone; the several variables which can in practice be controlled so as to establish such different predetermined conditions are temperature and concentration. There is illustrated hereinbelow in Table I various conditions of temperature and acid concentration which can combine to establish in the exit gas a fixed concentration of 2% gaseous hydrogen chloride (by volume) while concurrently establishing a water vapor content or concentration which may vary from 0.4% to 47% (by volume); the balance of the gas in this instance is assumed to be solely hydrogen. Such as gas could, for instance, be used in the reducing reaction hereinabove described in respect to Fig. 1 of the present drawings.

*Table I.—Temperature.—Concentration relations to condition reducing gas with 2% HCl*

| Conditioning Zone Temperature, °F. | Acid Concentration, Percent by Weight | Reducing Gas Composition, Percent by Volume | | |
|---|---|---|---|---|
| | | HCl | H₂ | H₂O |
| 57 | 32 | 2 | 97.6 | 0.4 |
| 68 | 31 | 2 | 97.4 | 0.6 |
| 77 | 30 | 2 | 97.1 | 0.9 |
| 87 | 29 | 2 | 96.7 | 1.3 |
| 95 | 28.5 | 2 | 96 | 2.0 |
| 104 | 27.5 | 2 | 95.4 | 2.6 |
| 113 | 26.5 | 2 | 94.3 | 3.7 |
| 122 | 25.5 | 2 | 92.5 | 5.5 |
| 140 | 23.5 | 2 | 88 | 10 |
| 158 | 21.5 | 2 | 81 | 17 |
| 176 | 20 | 2 | 71 | 27 |
| 194 | 18 | 2 | 51 | 47 |

In Table II a similar set of data is given with the exception that the gas leaving the gas-conditioning zone in each instance reported in this table is to be conditioned so that the gaseous hydrogen chloride concentration will always be 4% by volume.

*Table II.—Temperature.—Concentration relations to condition reducing gas with 4% HCl*

| Conditioning Zone Temperature, °F. | Acid Concentration, Percent by Weight | Reducing Gas Composition, Percent by Volume | | |
|---|---|---|---|---|
| | | HCl | H₂ | H₂O |
| 77 | 32 | 4 | 95.2 | 0.8 |
| 86 | 31 | 4 | 94.8 | 1.2 |
| 95 | 30.5 | 4 | 94.3 | 1.7 |
| 104 | 29.5 | 4 | 93.5 | 2.5 |
| 113 | 28.5 | 4 | 92.5 | 3.5 |
| 122 | 27.5 | 4 | 91.4 | 4.6 |
| 140 | 26 | 4 | 87.3 | 8.7 |
| 158 | 24 | 4 | 81 | 15 |
| 176 | 22.2 | 4 | 71 | 25 |
| 194 | 20.5 | 4 | 61 | 35 |

In Table III a similar set of data is given except that in each instance the gaseous hydrogen chloride concentration in the gases is 10% by volume.

Table III.—Temperature.—Concentration relations to condition reducing gas with 10% HCl

| Conditioning Zone Temperature, °F. | Acid Concentration, Percent by Weight | Reducing Gas Composition, Percent by Volume | | |
|---|---|---|---|---|
| | | HCl | $H_2$ | $H_2O$ |
| 60 | 36 | 10 | 89.8 | 0.2 |
| 82 | 34 | 10 | 89.25 | 0.75 |
| 104 | 32 | 10 | 88 | 2.0 |
| 122 | 30.5 | 10 | 86.3 | 3.7 |
| 140 | 29 | 10 | 82.5 | 7.5 |
| 158 | 27 | 10 | 78 | 12 |
| 176 | 25 | 10 | 66 | 24 |
| 194 | 23.5 | 10 | 53 | 37 |

EXAMPLE II

This example illustrates a practical set of conditions applicable to the Fig. 2 form of the invention when used in conjunction with a reducing reaction as hereinabove described, and wherein the gas being handled consists essentially of hydrogen, water vapor and hydrogen chloride. Under such circumstances, a workable set of data which has been proven to be practical throughout involves the treating of a gas coming from the reducer as follows:

The gas on leaving the reducing equipment at zones $a$ and $b$ (no bleed-off in this example) comprised 34.0 cubic feet per minute (calculated to standard conditions) at an actual pressure of about one pound gauge. The composition of the gas in these zones ($a$ and $b$) was (at standard conditions, based on a total of 34.0 cu. ft.), 25.80 cu. ft. hydrogen, 6.94 cu. ft. water vapor, and 1.26 cu. ft. HCl. To this gas there was added (as make-up gas) pure hydrogen gas at the rate of about 4 cubic feet per minute (again at standard conditions) of hydrogen. The gas entered the gas-conditioning zone at a rate of 38.0 C. F. M. (standard conditions) and at a temperature (actual condition) of 450° F. and at about 1.5 pounds gauge pressure (actual condition). There was also supplied to the gas-conditioning zone about 10.0 pounds per minute of 26.5% (by wt.) hydrochloric acid solution at 137° F. The effluent liquid (aqueous solution of HCl) consisted of 10.186 pounds per minute of 26% hydrochloric acid also at 137° F. The gases passing out of the gas-conditioning zone totaled 34.0 cubic feet per minute (standard conditions) at about 1.0 pound gauge pressure and at 137° F. (pressure and temperature are actual conditions), this gas having a composition: (based on 34.0 cu. ft.—standard condition) of 29.80 cu. ft. hydrogen, 2.94 cu. ft. water vapor, and 1.26 cu. ft. HCl; the difference (4 C. F. M) in the rate (volume) of gas entering (38.0) and leaving (34.0) the gas-conditioning zone being accounted for by the rate (volume) of $H_2O$ removal. The treated gas was then recirculated to the reducing equipment.

EXAMPLE III

In this example a gas was used containing water vapor and HCl and also containing methane in addition to hydrogen. The methane acted, in practice, as a reducing agent to some extent, so as to produce some of the oxides of carbon. In this test the make-up gas consisted of 90% hydrogen and 10% methane (both by volume). The gases were used in a system substantially as shown in Fig. 1 and hereinabove described. All gas compositions are given hereinafter in terms of cubic feet per minute under standard conditions. These can, of course, be changed by calculation to percentages based upon the total volume of the gas in each instance. In this instance the gas composition in zone $a$ at the exit of the reducing equipment is as follows:

| | C. F. M. (std.) |
|---|---|
| $H_2$ | 23.75 |
| $CO_2$ | 0.623 |
| CO | 2.829 |
| HCl | 1.00 |
| $H_2O$ | 6.00 |
| $CH_4$ | 4.158 |
| Total | 38.36 |

The bleed-off gas (by volume as aforesaid) was as follows:

| | C. F. M. (std.) |
|---|---|
| $H_2$ | 1.250 |
| $CO_2$ | 0.033 |
| CO | 0.149 |
| HCl | 0.053 |
| $H_2O$ | 0.316 |
| $CH_4$ | 0.218 |
| Total | 2.019 |

In this example it is noted that bleeding off of gas is necessary so as to prevent the continued accumulation of relatively inert gases, such as $CO_2$. The gas composition in zone $b$ then consisted of:

| | C. F. M. (std.) |
|---|---|
| $H_2$ | 22.50 |
| $CO_2$ | 0.59 |
| CO | 2.68 |
| HCl | 0.947 |
| $H_2O$ | 5.684 |
| $CH_4$ | 3.94 |
| Total | 36.341 |

The make-up gas supplied in this instance comprised (on the same basis given above):

| | C. F. M. (std.) |
|---|---|
| $H_2$ | 3.6 |
| $CH_4$ | 0.4 |
| Total | 4.0 |

Thus, the composition of the gas at zone $c$ going into the conditioner comprised (on the same basis):

| | C. F. M. (std.) |
|---|---|
| $H_2$ | 26.10 |
| $CO_2$ | 0.59 |
| CO | 2.68 |
| HCl | 0.947 |
| $H_2O$ | 5.684 |
| $CH_4$ | 4.34 |
| Total | 40.341 |

This gas was at one and one-half pounds gauge pressure and at 450° F. (actual conditions).

The aqueous HCl solution supplied to the gas-conditioning zone consisted of 10 pounds per minute of 25.0% (by weight) hydrochloric acid solution at 142° F. The effluent liquid HCl solution consisted of 10.106 pounds per minute of 24.6% hydrochloric acid at 142° F. The gas (zone $d$) leaving the gas-conditioning zone consisted of 38.0 cubic feet per minute (standard conditions) of gas at 1.0 pound gauge pressure and at 142° F., this gas having a composition on the same basis given above of:

| | C. F. M. (std.) |
|---|---|
| $H_2$ | 26.10 |
| $CO_2$ | 0.59 |
| CO | 2.68 |
| HCl | 1.00 |
| $H_2O$ | 3.29 |
| $CH_4$ | 4.34 |
| Total | 38.00 |

From the above it will be noted that the HCl concentration in the gas is raised slightly to make up for the HCl lost in the bleed-off gas. This HCl is derived from the hydrochloric acid supplied to and through the gas-conditioning zone and illustrates the function of the process in adjusting and predetermining the concentration of HCl in the exit gas. The above data also clearly reveals that the treatment removes a substantial amount of water vapor.

It is also noted that the HCl concentration is maintained substantially constant; and particularly that the HCl to hydrogen ratio and the $H_2O$ to hydrogen ratio are both maintained substantially constant irrespective of the presence of inert gases in the gas being treated and/or other gases present in the gas composition.

While there is herein illustrated and described certain preferred embodiments of the present invention and some equivalents have been referred to in more or less detail, other equivalents of apparatus and/or of process steps will occur to those skilled in the art from a consideration of the foregoing description. We do not wish to be limited, therefore, except by the scope of the appended claims, which are to be construed validly as broadly as the state of the prior art permits.

What is claimed is:

1. The process of continuously treating a hot gaseous mixture containing water vapor and gaseous hydrogen chloride resulting from the reduction of an ore in the presence of hydrogen chloride, so as to produce a gaseous mixture capable of further use in such reduction, so as to cool the gaseous mixture, to reduce the water vapor content thereof, and to provide an exit gas having predetermined concentrations of water vapor and gaseous hydrogen chloride respectively, comprising the steps of passing said hot gaseous mixture continuously through a gas-conditioning zone, separately passing through said zone and in intimate contact with said gaseous mixture during the passage thereof through said zone an aqueous solution of HCl, controlling the concentration of the HCl in said aqueous solution supplied to said zone so that said aqueous solution in contact with the gases at the portion of said zone from which the gases leave said zone and at the then temperature of said aqueous solution is in equilibrium with a gas having said predetermined concentrations of water vapor and hydrogen chloride respectively, and controlling the temperature of the gases about to leave said zone and of the aqueous solution in contact therewith.

2. The process in accordance with claim 1, in which said gaseous mixture and said aqueous solution are both passed through said zone in a single concurrent direction.

3. The process in accordance with claim 1, in which said gaseous mixture contains, in addition to said water vapor and said gaseous hydrogen chloride, at least one additional gaseous constituent.

4. The process in accordance with claim 1, in which said temperature controlling step is effected by cooling said aqueous solution so as thereby to cool said gaseous mixture.

5. The process in accordance with claim 1, in which the purpose is to cool the gaseous mixture and to reduce the water vapor content thereof without substantially varying the total amount of hydrogen chloride contained in the exit gas as compared with the amount of said hydrogen chloride in the gases entering said zone in any given time period, and in which the concentration of HCl in said aqueous solution is adjusted to maintain the amount of hydrogen chloride in the gases passing through said zone per unit of time substantially constant.

6. The process of continuously treating a hot gaseous mixture containing water vapor, hydrogen and gaseous hydrogen chloride resulting from the reduction of an oxide ore in the presence of hydrogen chloride, so as to produce a gaseous mixture capable of further use in such reduction, so as to cool the gaseous mixture, to reduce the water vapor content thereof, and to provide an exit gas having predetermined concentrations of water vapor and gaseous hydrogen chloride respectively, comprising the steps of passing said hot gaseous mixture continuously through a gas-conditioning zone provided with heat abstraction means, passing a cooling fluid through the heat abstraction means of said gas-conditioning zone so as to withdraw heat from said zone, separately passing through said zone and in intimate contact with said gaseous mixture during the passage thereof through said zone an aqueous solution of HCl, controlling the concentration of the HCl in said aqueous solution supplied to said zone so that said aqueous solution in contact with the gases at the portion of said zone from which the gases leave said zone and at the then temperature of said aqueous solution is in equilibrium with a gas having said predetermined concentrations of water vapor and hydrogen chloride respectively, and controlling the rate of flow of said cooling fluid through said heat abstraction means, so as to control the temperature of the gases about to leave said zone and of the aqueous solution in contact therewith.

7. The process in accordance with claim 6, in which said gas-conditioning zone is provided by a falling film type condenser, in which the cooling fluid aforesaid is constituted by the cooling fluid passed through said condenser, and in which said aqueous solution of HCl comprises the fluid supplied to said condenser as the falling film thereof.

8. The process in accordance with claim 7, in which said hot gaseous mixture and said aqueous solution of HCl are both supplied to the upper end of the falling film type condenser and flow concurrently downwardly through said condenser.

9. The process in accordance with claim 6, comprising the additional step of controlling the cooling of said gases passing through said gas-conditioning zone by controlling the flow of said cooling fluid through said heat abstraction means in response to the temperature of the gases at a point at which such gases are leaving said gas-conditioning zone.

10. In a process for reducing a metal oxide by the use of a reducing gas containing a predetermined amount of gaseous hydrogen chloride in proportion to the amount of reducing gas, wherein said reducing gas reacts with the metal oxide to form water vapor, and wherein the gases used as aforesaid are recirculated through a reducing zone in which said metal oxide is present, and are augmented as to the reducing gas content thereof at a predetermined point in the recirculatory path thereof, the process of abstracting from the recirculating gases an amount of water vapor sufficient to maintain substantially constant the water vapor content thereof at the time of the entry of such gases into said reducing zone, while maintaining substantially undiminished the hydrogen chloride content of the recirculating gases, said process comprising the steps of passing the recirculated gases at a predetermined portion of their recirculatory path in contact with a flowing film of an aqueous solution of HCl, and controlling the temperature of said aqueous solution and the HCl content thereof to predetermined values respectively, so as to control the water vapor content and gaseous hydrogen chloride content of the gases when leaving said portion of their path in which they are in contact with said aqueous solution.

11. The process in accordance with claim 6, wherein the volume of hydrogen chloride solution is relatively large as compared to the quantity of hydrogen chloride gas in the gaseous mixture being treated, so that the concentration of said hydrogen chloride solution is relatively unaffected by the treatment.

12. The process in accordance with claim 6, in which the gaseous mixture being treated is substantially continuously recycled in an orbital path, in one part of which the reducing gas constituent of said gaseous mixture is in part converted to water vapor, and in another and subsequent point the concentration of said reducing gas constituent is augmented by the addition of a gas containing said reducing gas constituent to the gaseous mixture being recycled; and in which the treating step aforesaid is thereafter effected, so as to establish a predetermined ratio of hydrogen chloride to said reducing gas constituent when said gaseous mixture is again supplied to that part of its orbital path aforesaid in which said reducing gas constituent is in part converted to water vapor.

13. The process in accordance with claim 6, in which the step of subjecting said gaseous mixture to intimate contact with an aqueous hydrogen chloride solution is effected by flowing said solution along the inner walls of a plurality of tubes, and passing said gaseous mixture through said tubes in intimate contact with the solution flowing along the inner walls thereof.

14. The process in accordance with claim 6, in which said hydrogen chloride solution is recirculated in a closed circulatory system, and in which the concentration of a portion of said hydrogen chloride solution is increased at one portion of said closed circulatory system to a sufficient extent to maintain substantially constant the hydrogen chloride concentration of said solution in said closed circulatory system.

References Cited in the file of this patent

UNITED STATES PATENTS

| | | |
|---|---|---|
| 2,287,467 | Carpenter et al. | June 23, 1942 |
| 2,400,893 | Thurber et al. | May 28, 1946 |

FOREIGN PATENTS

| | | |
|---|---|---|
| 740,913 | Germany | Nov. 1, 1943 |